(No Model.)
C. G. JENNINGS.
INSECT TRAP.
No. 400,460. Patented Apr. 2, 1889.
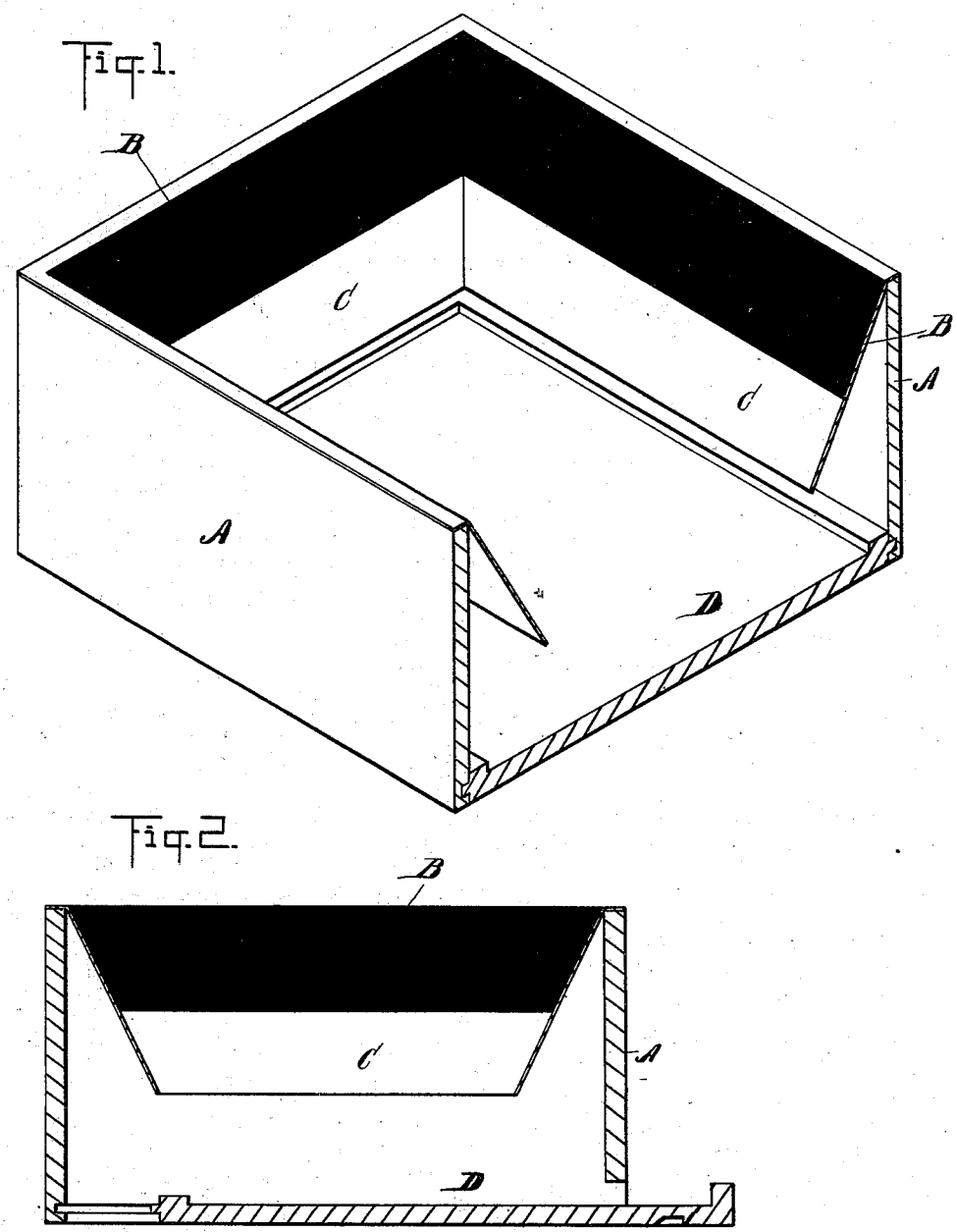
Attest.
John E. Wiles.
Anna E. White.
Inventor.
Charles G. Jennings
by Parker & Burton
his attorneys.

UNITED STATES PATENT OFFICE.

CHARLES G. JENNINGS, OF DETROIT, MICHIGAN.

INSECT-TRAP.

SPECIFICATION forming part of Letters Patent No. 400,460, dated April 2, 1889.

Application filed September 8, 1888. Serial No. 284,914. (No model.)

*To all whom it may concern:*

Be it known that I, CHARLES G. JENNINGS, a citizen of the United States, residing at Detroit, in the county of Wayne and State of Michigan, have invented a new and useful Improvement in Insect-Traps, of which the following is a specification.

My invention relates to that class of insect-traps in which the insect passes down through an opening in the top of a receptacle and drops into a recess from which it is unable to escape, and is intended to be used for trapping insects that are unable to escape by flight.

Figure 1 shows my trap with the front half cut away. Fig. 2 shows the arrangement for cleaning the trap and emptying out any insects that may have been caught.

A represents a box or receptacle, of any convenient shape, having its outer sides of wood or other moderately-rough material that will afford a foothold for an insect.

B represents the top, which is made of polished material throughout its under surface and throughout a part of its upper surface. This top is in the form of a hollow frustum of a pyramid or hollow frustum of a cone to fit the box A. The smaller end of the hollow frustum extends downward into the box, affording a re-entering flange, and thus affording an inclined surface extending from the edge of the box to the opening through the cover. Of this inclined surface a zone, B, immediately adjacent to the outer edge of the cover, is roughened or covered with some moderately-rough material—such as paint, paper, or cloth—and within this and adjacent to the opening is another zone, C, of polished material, the object of the two zones being to enable the insect to advance some distance down along the inclined cover, over a surface which will afford it a moderately secure footing; but as the insect passes from the roughened zone to the polished zone its security of footing ceases, and having passed wholly or partially from the one to the other it is unable to turn around or recover itself, and the weight of its body carries it down the polished zone into the trap. The bottom of the box is made removable to enable it to be readily cleaned. This may be accomplished in any or a great number of ways. In Fig. 2 the bottom D is shown as a small drawer that slides into the box; or the top may be made to lift out of the box like an ordinary pail-cover.

I am aware that there are many articles having covers of the general shape I have described; but I am not aware that any one of them has ever been made with the outer zone of roughened material and the inner zone of polished material, and I find that this combination effects the desired result.

Having thus described my invention, what I claim as novel, and desire to have secured to me by Letters Patent, is—

In an insect-trap, a re-entering inclined flange having a roughened zone extending from its outer edge toward the center, and a polished zone extending from the roughened zone to the lower edge of the flange, both of said zones being located upon the same inclined surface.

CHARLES G. JENNINGS.

Witnesses:
CHARLES H. FISK,
CHARLES F. BURTON.